C. FULLER.
MACHINES FOR PICKING STONES, &c.
No. 194,346. Patented Aug. 21, 1877.
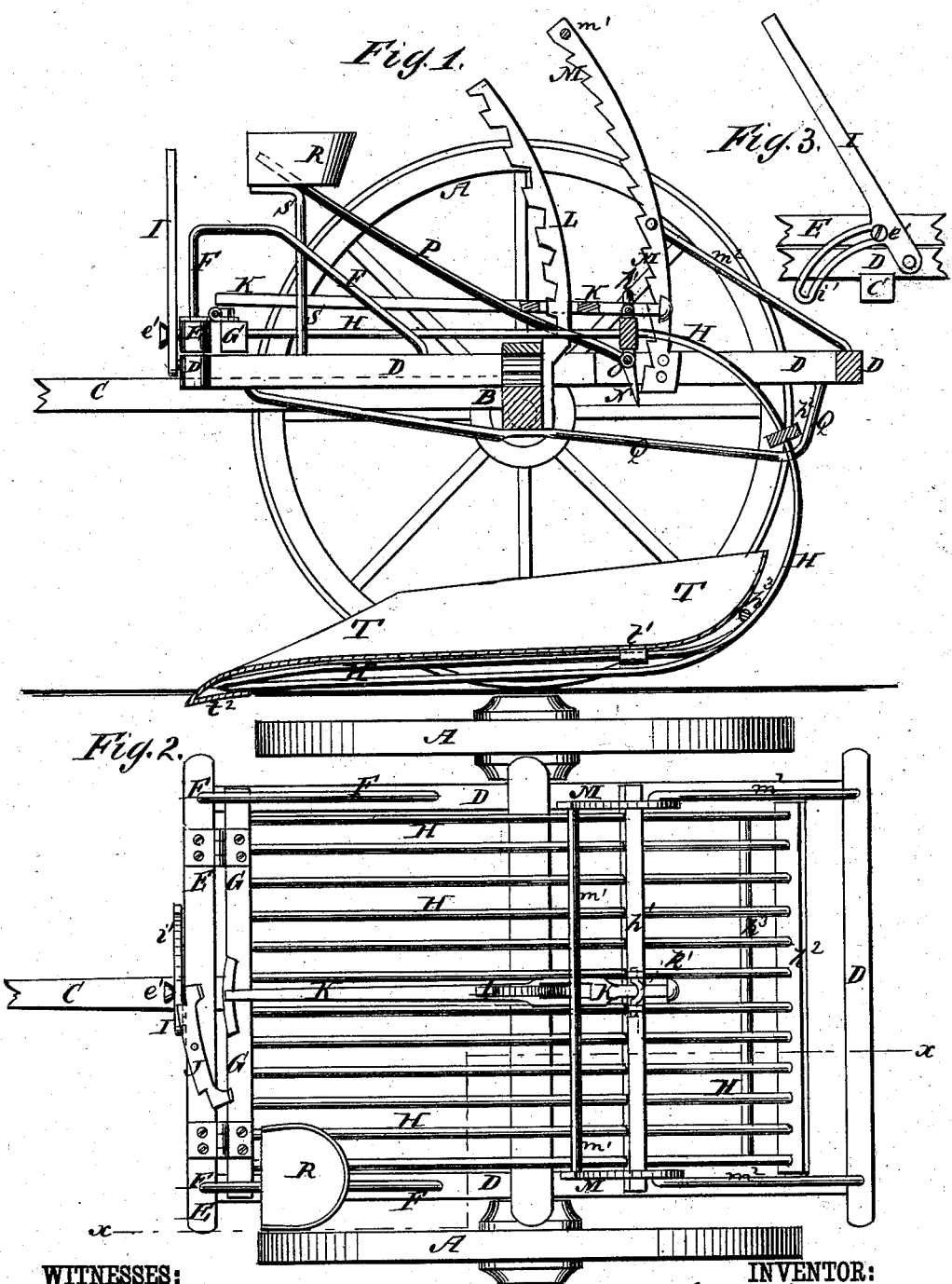

UNITED STATES PATENT OFFICE.

CHARLES FULLER, OF LITTLE MARSH, PENNSYLVANIA.

IMPROVEMENT IN MACHINES FOR PICKING STONES, &c.

Specification forming part of Letters Patent No. 194,346, dated August 21, 1877; application filed July 23, 1877.

*To all whom it may concern:*

Be it known that I, CHARLES FULLER, of Little Marsh, in the county of Tioga and State of Pennsylvania, have invented a new and useful Improvement in Machines for Picking Stones, &c., of which the following is a specification:

Figure 1 is a vertical section of my improved machine, taken through the broken line $x\ x$, Fig. 2. Fig. 2 is a top view of the same. Fig. 3 is a detail front view of a part of the same.

Similar letters of reference indicate corresponding parts.

The object of this invention is to furnish an improved machine for picking, hauling, and delivering stone, manure, dirt, &c., which shall be simple in construction, effective in operation, and conveniently operated and controlled.

The invention consists in the combination of the hinged cross-bar and the U-rods, connected by cross-bars with the frame-work of the machine; in the combination of the adjustable cross-bar and the guide-rods with the hinged cross-bar to which the U-rods are attached, and with the frame of the machine; in the combination of the lever provided with the slotted curved arm and the pin, with the frame of the adjustable cross-bar and the hinged cross-bar, to which the U-rods are attached; in the combination of the lever and the notched fulcrum-bar with the cross-bar of the U-rods, and with the axle of the carriage; in the combination of the ratchet-bars, the pawls, the rod, and the lever, with the cross-bar of the U-rods, and with the frame of the carriage; and in the combination of the scraper provided with the keepers and the flange-socket with the lower arms of the U-rods, as hereinafter fully described.

A are the wheels, which revolve upon the journals of the axle B. C is the tongue, the rear end of which is securely attached to the axle B. To the axle B and tongue C is attached a frame, D, consisting of two side bars, connected at their ends by two cross-bars. I prefer to have the frame D movable, so that it may be adjusted to balance the load, and prevent it from bearing too heavily upon the horses' necks. Upon the forward cross-bar of the frame D is placed a cross-bar, E, which slides up and down upon guide-rods F, attached to the ends of the said forward cross-bar of the frame D. The guide-rods F extend upward vertically for a suitable distance, and are then bent to the rearward and downward, and their ends are attached to the side bars of the frame D, so as to serve as braces.

To the rear side of the cross-bar E is hinged a cross-bar, G, to which are attached the ends of the upper arms of a set of parallel U-rods, H. The U-rods H are connected and held in their proper relative positions by cross bars or rods $h^1\ h^2\ h^3$, placed at the upper, middle, and lower parts of their bends.

The ends of the upper cross-bar $h^1$ project so as to rest upon the side bars of the frame D, and prevent the U-rods H from dropping too low. The lower arms of the outer or side rods H are raised a little, to serve as rails to prevent the load from falling off at the sides. To the middle part of the forward cross-bar of the frame D is pivoted the lower end of a lever, I, upon the lower part of which is formed a curved cam-arm, $i'$. The arm $i'$ is slotted longitudinally to receive a pin, $e'$, attached to the middle part of the cross-bar E, so that by operating the lever I the cross-bar E may be raised to raise the lower ends of the U-rods H, to enable them to pass over obstructions, and to prevent the load from falling off while being transported. The lever I is secured in either position by a button, J, which is pivoted at its center to the cross-bar E, and has a notch or catch in each end to receive the said lever I.

K is a lever, the rear end of which passes through and slides in a keeper, $k'$, attached to the upper cross-bar $h^1$ of the U-rods H. The lever K is slotted to receive the curved bar L, the lower end of which is attached to the middle part of the axle B, and its forward or concaved edge is notched to receive the lever K, and serve as fulcrums for said lever. To the side bars of the frame D are attached the lower ends of the curved bars M, the upper ends of which are connected by a round, $m^1$, and which are strengthened by the braces $m^2$. The upper ends of the braces $m^2$ are attached to the curved bars M, and their lower ends are attached to the rear corners of the frame D.

The forward or concaved edges of the bars M are notched, or have ratchet-teeth formed in them, to receive the pawls N, which are attached to a rod, O. The rod O works in bearings attached to the under side of the cross-bar $h^1$, and to it is rigidly attached the lower end of a lever, P, so that by operating the lever P the pawls N may be thrown into gear with the ratchet-bars M to support the U-bars H and their load while adjusting the lever K upon the fulcrum-bar L for another stroke, while raising the U-bars for transporting the load, and for discharging the load when it has been drawn to the place of deposit.

The lever K may also be used for holding the U-rods H to their work by placing it in the lowest notch of the bar L and dropping its forward end behind a stop attached to the bar G, or into a notch formed in said bar.

The U-bars H are kept in place laterally while being raised and lowered by the guide-rods Q, attached to the lower sides of the side bars of the frame D.

R is the driver's seat, which is attached to the upper end of the standard S. The lower end of the standard S is attached to the forward part of one of the side bars of the frame D.

When the machine is to be used for handling dirt and other fine substances a scoop or scraper, T, is placed upon the lower arms of the U-rods H. The scraper T has two or more keepers, $t^1$, formed upon its bottom to receive two or more of the rods H, and thus keep the rear part of the scraper in position. Upon the lower side of the forward edge of the scraper T is formed, or to it is attached, a rearwardly-projecting flange, $t^2$, to form a long socket to receive the forward ends of the lower arms of the U-bars H.

Having thus described my invention, I claim as new and desire to secure by Letters Patent—

1. The combination of the hinged cross-bar G and the U-rods H, connected by the cross-bars $h^1$ $h^2$ $h^3$ with the frame-work of the machine, substantially as herein shown and described.

2. The combination of the adjustable cross-bar E and the guide-rods F with the hinged cross-bar G, to which the U-rods H are attached, and with the frame D, substantially as herein shown and described.

3. The combination of the lever I, provided with the slotted curved arm $i'$ and the pin $e'$, with the frame D, the adjustable cross-bar E, and the hinged bar G, to which the U-rods H are attached, substantially as herein shown and described.

4. The combination of the lever K and the notched fulcrum-bar L with the cross-bar $h^1$ of the U-rods H, and with the axle B of the carriage, substantially as herein shown and described.

5. The combination of the ratchet-bars M, the pawls N, the rod O, and the lever P, with the cross-bar $h^1$ of the U-rods, and with the frame D, substantially as herein shown and described.

6. The combination of the scraper T, provided with the keeper $t^1$ and the flange-socket $t^2$, with the lower arms of the U-rods H, substantially as herein shown and described.

CHARLES FULLER.

Witnesses:
 MINER JACKSON,
 GEORGE TAYLOR.